US010536622B2

(12) United States Patent
Shimada

(10) Patent No.: US 10,536,622 B2
(45) Date of Patent: Jan. 14, 2020

(54) CAMERA DEPTH PREDICTION USING GENERATIVE ADVERSARIAL NETWORK

(71) Applicant: SONY CORPORATION, Tokyo (JP)

(72) Inventor: Junji Shimada, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/980,495

(22) Filed: May 15, 2018

(65) Prior Publication Data

US 2019/0356842 A1    Nov. 21, 2019

(51) Int. Cl.
*H04N 5/232*       (2006.01)
*H04N 5/225*       (2006.01)

(52) U.S. Cl.
CPC ....... *H04N 5/23212* (2013.01); *H04N 5/2257* (2013.01)

(58) Field of Classification Search
None
See application file for complete search history.

(56) References Cited

U.S. PATENT DOCUMENTS

| 2008/0031327 A1* | 2/2008 | Wang | H04N 5/2226 |
| | | | 375/240.12 |
| 2010/0202666 A1* | 8/2010 | Ren | G06K 9/00604 |
| | | | 382/117 |
| 2013/0101177 A1* | 4/2013 | Yamada | G06T 7/246 |
| | | | 382/107 |
| 2013/0308036 A1* | 11/2013 | Peng | H04N 5/23212 |
| | | | 348/345 |
| 2015/0201182 A1* | 7/2015 | Chang | H04N 5/23212 |
| | | | 348/47 |
| 2016/0027202 A1* | 1/2016 | Sudheendra | G06F 3/041 |
| | | | 345/473 |
| 2016/0173851 A1* | 6/2016 | Kim | G06K 9/46 |
| | | | 382/154 |
| 2017/0069097 A1* | 3/2017 | Molgaard | H04N 5/23238 |
| 2017/0339363 A1* | 11/2017 | Hiasa | H04N 5/235 |
| 2017/0374269 A1* | 12/2017 | Govindarao | G02B 7/38 |
| 2018/0286105 A1* | 10/2018 | Surti | G02B 27/017 |
| 2019/0096035 A1* | 3/2019 | Li | G06T 3/4053 |
| 2019/0155284 A1* | 5/2019 | Zavesky | G05D 1/0088 |

FOREIGN PATENT DOCUMENTS

CN       106845471 A    6/2016
WO       2017/191463 A1  11/2017

* cited by examiner

*Primary Examiner* — James M Hannett
(74) *Attorney, Agent, or Firm* — O'Banion & Ritchey LLP; John P. O'Banion

(57) ABSTRACT

An apparatus and method for improving camera depth estimations for a moving subject in the camera field of view. The camera utilizes a generative adversarial network (GAN) to predict future frames from a current frame(s). These predicted future frames are then utilized as a target for determining a depth map from which lens focusing direction and distance are determined for moving the camera into proper focus and thus reducing focusing errors on captured frames as target and/or camera motion progresses.

11 Claims, 4 Drawing Sheets

CAMERA DEPTH PREDICTION USING GENERATIVE ADVERSARIAL NETWORK

CROSS-REFERENCE TO RELATED APPLICATIONS

Not Applicable

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This disclosure pertains generally to estimating focal distance, and more particularly to estimating focal distance in response to depth mapping between a current frame and future frames estimated by a generative adversarial network.

2. Background Discussion

Numerous techniques are currently being utilized for estimating image depth, such as in camera focus control. Techniques currently in use include both active and passive techniques. Active techniques rely on utilizing one or more sensors for estimating distance, while passive techniques rely on information extracted from captured images, such as blur matching processes. The industry is primarily moving toward enhancing passive depth estimation techniques for both cost and performance reasons.

However, predicting depth information in passive depth estimation is difficult, in view of the movement of the target object and the time required to adjust focus on the camera lens.

Accordingly, a need exists for an enhanced passive depth estimation apparatus and process. The present disclosure fulfills that need and provides additional benefits over previous technologies.

BRIEF SUMMARY

An apparatus and method for predicting depth information in the future based on the current frame and the future frame(s) generated by a generative adversarial network (GAN) toward optimizing focus on an object in the field of view of a camera system.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Introduction

The present disclosure is configured for more readily and accurately predicting depth information for future frames estimated utilizing a generative adversarial network (GAN). A depth map for future frames is predicted from using the picture at current frame and the picture from GAN predicted future frame(s) to determine how to move the camera lens to be focused correctly for the target object. Thus, target object depth can be predicted for the future, allowing decisions to be made on which direction a focus lens is to be moved toward achieving fast and accurate focusing.

2. Problem Statement

Figure 1:
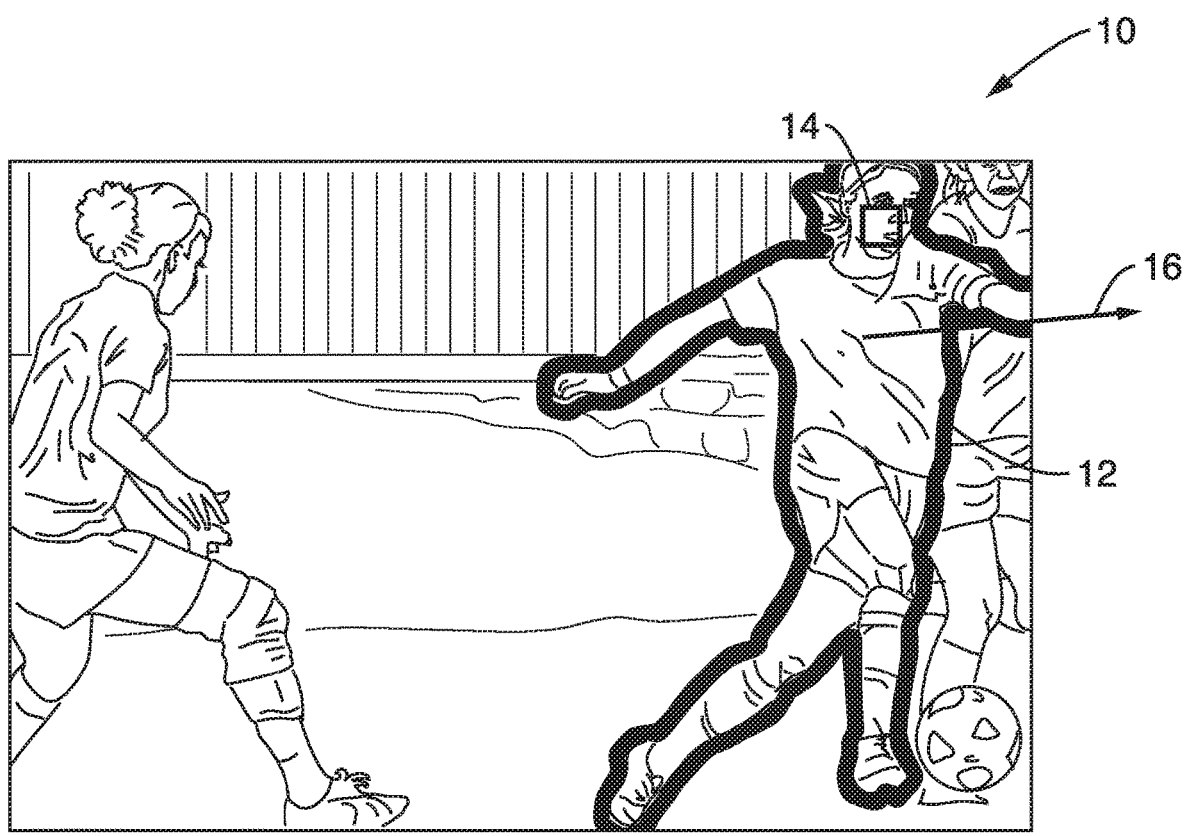
FIG. 1 is an image rendition of persons in motion with an individual shown outlined selected in response to facial features and showing direction of motion, according to an embodiment of the present disclosure.

FIG. 1 illustrates an example embodiment 10 of the difficulties in predicting depth information, in particular in regard to a moving focus target. The focus target 12 is an individual tracked by a recognition process, herein depicted as facial recognition 14, and for determining a direction of motion 16.

The camera system obtains data from the frame of FIG. 1, however, it has been difficult to predict the auto-focus (AF) depth position of the focus target (subject) based on this depth information as the camera and focus target is moving. The focus lens needs to be moved to keep up with the subject, but it requires time to move the focus position and the new position cannot be accurately predicted utilizing linear extrapolation.

Figure 2:
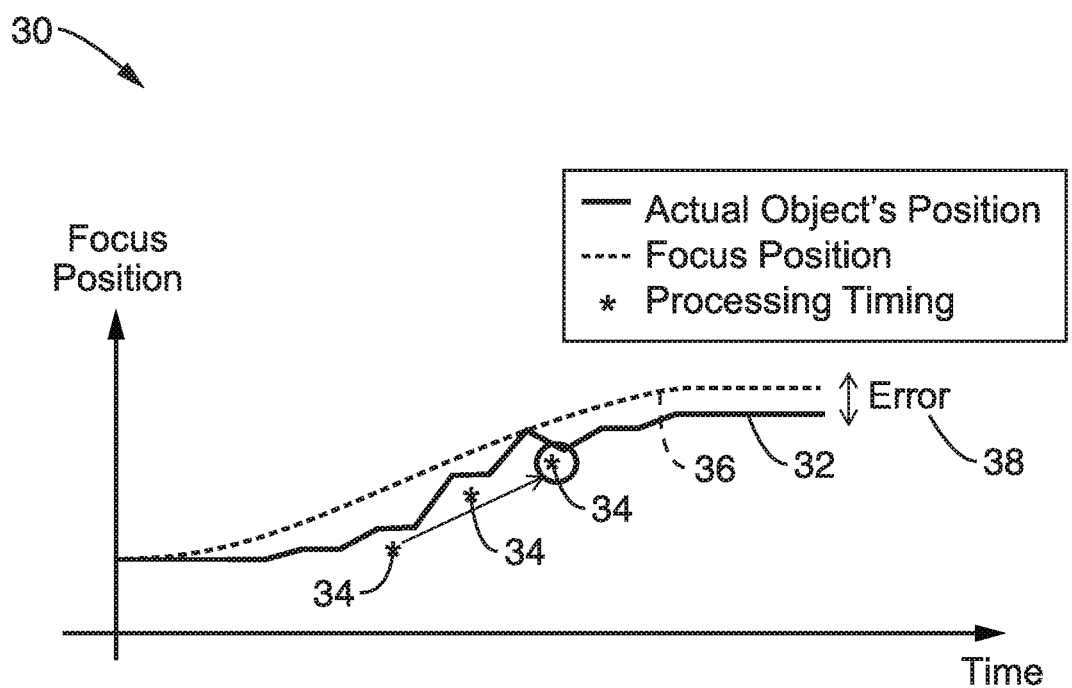
FIG. 2 is a plot of target depth (focus position) showing typical camera autofocusing toward matching the actual object position.

FIG. 2 illustrates an example 30 of camera focus adjustments 36, and process timing 34 between focus positions, in relation to actual object position 32. The resultant focusing error 38 can be significant with subject being seen as out of focus.

3. Embodiments

The present disclosure is configured to overcome the errors seen in FIG. 2, by predicting target depth while taking into account the period of time required for moving the focus lens to the target. If the future conditions are not properly determined, then the resultant subject image will be out of focus.

Figure 3:
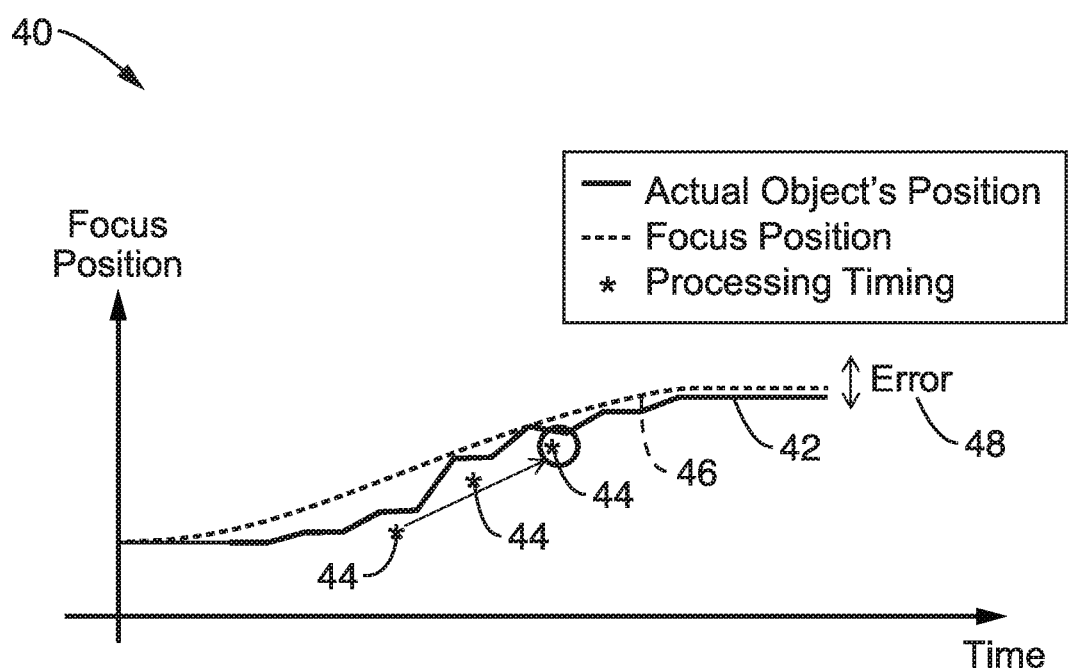
FIG. 3 is a plot of target depth (focus position) showing camera autofocusing toward matching the actual object position, according to an embodiment of the present disclosure.

FIG. 3 illustrates an example focus position plot 40 according to the present disclosure, in which future focus positions 46 are more accurately determined at processing timing 44 for the actual object position 42. The amount of error 48 is seen as being less than in FIG. 2.

Figure 4:
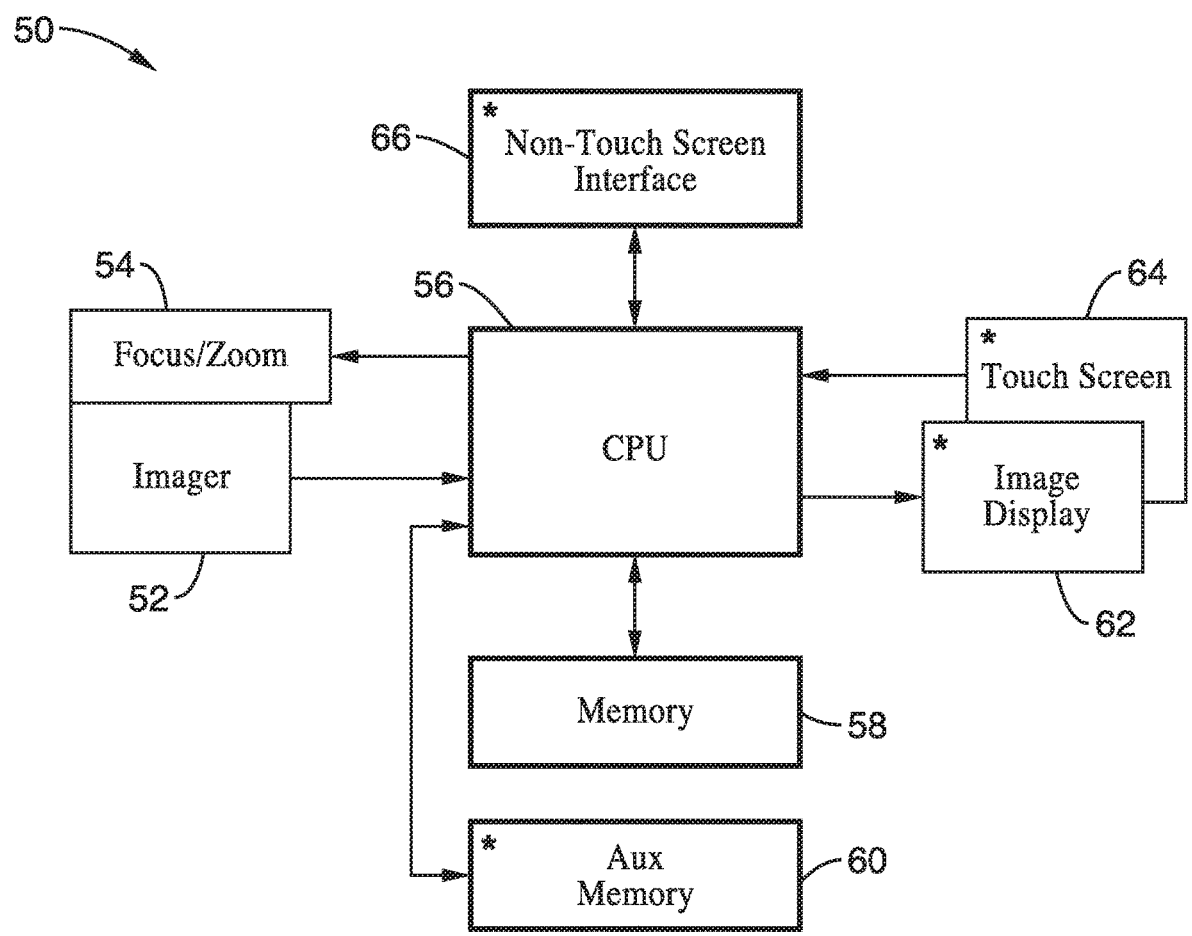
FIG. 4 is a block diagram of a camera system configured for utilizing a generative adversarial network, according to an embodiment of the present disclosure.

FIG. 4 illustrates an example embodiment 50 of an image capture device (e.g., camera system, camera-enable cell phone, or other device capable of capturing a sequence of images/frame.) which can be configured for performing depth estimation utilizing the GAN based technique as described in this present disclosure. The elements depicted (60, 62, 64, 66) with an asterisk indicate camera elements which are optional in an image capture device utilizing the present technology. A focus/zoom control 54 is shown coupled to imaging optics 52 as controlled by a computer processor (e.g., one or more CPUs, microcontrollers, and/or DSPs) 56.

Computer processor 56 performs the depth estimation based on utilizing generative adversarial network (GAN) in response to instructions executed from memory 58 and/or optional auxiliary memory 60. Shown by way of example are an optional image display 62 and optional touch screen 64, as well as optional non-touch screen interface 66. The present disclosure is non-limiting with regard to memory and computer-readable media, insofar as these are non-transitory, and thus not constituting a transitory electronic signal.

Figure 5:
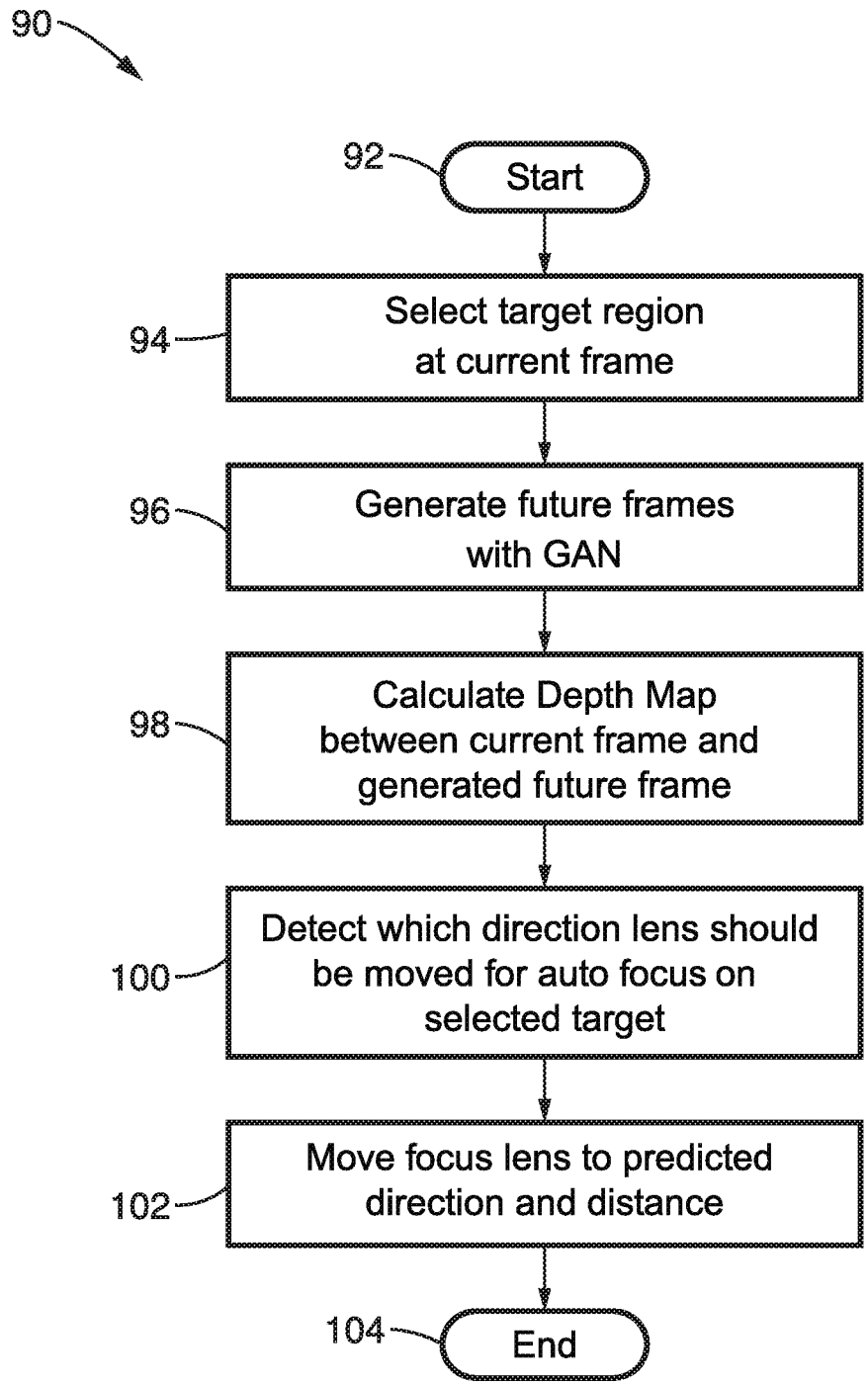
FIG. 5 is a flow diagram of predicting camera object depth according to an embodiment of the present disclosure.

FIG. 5 illustrates an example embodiment 90 of depth estimation performed by programming executing from memory 58, 60 on processor 56 as was seen in FIG. 4. Execution starts 92 and selects 94 a target region in the current frame. Then future frames are generated 96 using GAN. Based on the current frame and the GAN predicted future frames, a depth map is determined 98, and a determination made 100 on which direction and distance the lens focusing should be adjusted to auto focus on the selected target. The camera then moves 102 the focus lens in the predicted direction for the determined distance. For the sake of simplicity of illustration, the process is shown ending 104, however, typically it would continue iterating so that focal positions of the selected target are updated so long as the camera is capturing frames.

4. General Scope of Embodiments

The enhancements described in the presented technology can be readily implemented within various cameras and other portable electronic devices configured for capturing image sequences (videos). It should also be appreciated that cameras, camera-equipped mobile phone, and similar devices are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula (e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware.

It will further be appreciated that as used herein, that the terms processor, hardware processor, computer processor, central processing unit (CPU), and computer are used synonymously to denote devices capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for adjusting depth of focus in response to predicting future frames, comprising: (a) an image sensor configured for capturing digital images; (b) a focusing device coupled to said image sensor for controlling focal length of a digital image being captured; (c) a processor configured for performing image processing on images captured by said image sensor, and for outputting a signal for controlling focal length set by said focusing device; and (d) a memory storing programming executable by said processor for estimating depth of focus based on blur differences between images; (e) wherein said programming when executed by said processor performs steps comprising: (e)(i) selecting a target region at the current frame captured by said image sensor; (e)(ii) generating estimations of at least one future frame utilizing a generative adversarial network (GAN); (e)(iii) generating a depth map between said current frame and said at least one future frame; (e)(iv) determining direction and distance for adjusting said focusing device coupled to said image sensor; and (e)(v) moving said focusing device toward achieving a proper focus at said at least one future frame.

2. An apparatus for adjusting depth of focus in response to predicting future frames, comprising: (a) an image sensor of an image capture device, said image sensor configured for capturing digital images; (b) wherein said image capture device is selected from a group of image capture devices consisting of camera systems, camera-enabled cell phones, and other image-capture enabled electronic devices; (b) a focusing device coupled to said image sensor for controlling focal length of a digital image being captured; (c) a processor configured for performing image processing on images captured by said image sensor, and for outputting a signal for controlling focal length set by said focusing device; and (d) a memory storing programming executable by said processor for estimating depth of focus based on blur differences between images; (e) wherein said programming when executed by said processor performs steps comprising: (e)(i) selecting a target region at the current frame captured by said image sensor; (e)(ii) generating estimations of at least one future frame utilizing a generative adversarial network (GAN); (e)(iii) generating a depth map between said current frame and said at least one future frame; (e)(iv) determining direction and distance for adjusting said focusing device coupled to said image sensor; and (e)(v) moving said focusing device toward achieving a proper focus at said at least one future frame.

3. A method for adjusting depth of focus in response to predicting future frames, comprising: (a) selecting a target region at the current frame captured by an image sensor within a device configured for capturing digital images utilizing an autofocus process; (b) generating estimations of at least one future frame utilizing a generative adversarial network (GAN) executing on a processor which is executing programming from a memory; (c) generating a depth map between said current frame and said at least one future frame; (d) determining direction and distance for adjusting a focusing device coupled to the image sensor; and (e) moving said focusing device toward achieving a proper focus at said at least one future frame.

4. The apparatus or method of any preceding embodiment, wherein said apparatus comprises an image capture device selected from a group of image capture devices consisting of camera systems, camera-enabled cell phones, and other image-capture enabled electronic devices.

5. The apparatus or method of any preceding embodiment, wherein said programming executable on said processor is configured for performing auto focusing in which said focus device coupled to said image sensor is adjusted based on estimated focus distance, and another image is captured, after which focus distance estimation is again performed with the new depth, and repeating this process to maintain a proper focus on the selected target region.

6. The apparatus or method of any preceding embodiment, wherein method is configured for performing auto focusing in which the focus device coupled to the image sensor is adjusted based on estimated focus distance, and another image is captured, after which focus distance estimation is again performed with the new depth, and repeating this process to maintain a proper focus on the selected target region.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for adjusting depth of focus in response to predicting future frames, comprising:
    (a) an image sensor configured for capturing digital images;
    (b) a focusing device coupled to said image sensor for controlling focal length of a digital image being captured;
    (c) a processor configured for performing image processing on images captured by said image sensor, and for outputting a signal for controlling focal length set by said focusing device; and
    (d) a memory storing programming executable by said processor for estimating depth of focus based on blur differences between images in a blur matching process;
    (e) wherein said programming when executed by said processor performs enhanced passive depth estimation by steps comprising:
        (i) selecting a moving focus target region, which is being tracked by a recognition process, at the current frame captured by said image sensor;
        (ii) generating estimations of at least one future frame utilizing a generative adversarial network (GAN);
        (iii) generating a depth map between said current frame and said at least one future frame in predicting future depth information while taking into account the period of time required for moving the focusing device to the moving focus target;
        (iv) determining direction and distance for adjusting said focusing device coupled to said image sensor to auto focus on the moving focus target region; and
        (v) moving said focusing device toward achieving a proper focus at said at least one future frame to update focus position of the selected moving focus target region.

2. The apparatus of claim 1, wherein said apparatus comprises an image capture device selected from a group of image capture devices consisting of camera systems, camera-enabled cell phones, and other image-capture enabled electronic devices.

3. The apparatus of claim 1, wherein said programming executable on said processor is configured for performing auto focusing in which said focus device coupled to said image sensor is adjusted based on estimated focus distance, and another image is captured, after which focus distance estimation is again performed with the new depth, and repeating this process to maintain a proper focus on the selected target region.

4. The apparatus as recited in claim 1, wherein said programming executable on said processor is configured for performing said recognition process by utilizing facial recognition.

5. An apparatus for adjusting depth of focus in response to predicting future frames, comprising:
    (a) an image sensor of an image capture device, said image sensor configured for capturing digital images;
    (b) wherein said image capture device is selected from a group of image capture devices consisting of camera systems, camera-enabled cell phones, and other image-capture enabled electronic devices;
    (b) a focusing device coupled to said image sensor for controlling focal length of a digital image being captured;
    (c) a processor configured for performing image processing on images captured by said image sensor, and for outputting a signal for controlling focal length set by said focusing device; and
    (d) a memory storing programming executable by said processor for estimating depth of focus based on blur differences between images in a blur matching process;
    (e) wherein said programming when executed by said processor performs enhanced passive depth estimation by steps comprising:
        (i) selecting a moving focus target region at the current frame captured by said image sensor which is being tracked by a recognition process;
        (ii) generating estimations of at least one future frame utilizing a generative adversarial network (GAN);
        (iii) generating a depth map between said current frame and said at least one future frame in predicting future depth information while taking into account a period of time required for moving the focusing device to the moving focus target;
        (iv) determining direction and distance for adjusting said focusing device coupled to said image sensor to auto focus on the moving focus target region; and
        (v) moving said focusing device toward achieving a proper focus at said at least one future frame to update focus position of the selected moving focus target region.

6. The apparatus of claim 5, wherein said programming executable on said processor is configured for performing auto focusing in which said focus device coupled to said image sensor is adjusted based on estimated focus distance, and another image is captured, after which focus distance estimation is again performed with the new depth, and repeating this process to maintain a proper focus on the selected moving focus target region.

7. The apparatus as recited in claim 5, wherein said programming executable on said processor is configured for performing said recognition process by utilizing facial recognition.

8. A method for adjusting depth of focus in response to predicting future frames, comprising:
    (a) capturing digital images utilizing an autofocus process based on estimating depth of focus based on blur differences between images in a blur matching process;
    (b) selecting a moving focus target region, which is tracked by a recognition process, at the current frame captured by an image sensor within a device configured for capturing digital images utilizing an enhanced passive depth estimation process;

(c) generating estimations of at least one future frame utilizing a generative adversarial network (GAN) executing on a processor which is executing programming from a memory;
(d) generating a depth map between said current frame and said at least one future frame in predicting future depth information while taking into account a period of time required for moving the focusing device to the moving focus target;
(e) determining direction and distance for adjusting a focusing device coupled to the image sensor to auto focus on the moving focus target region; and
(f) moving said focusing device toward achieving a proper focus at said at least one future frame to update focus position of the selected moving focus target region.

9. The method as recited in claim 8, wherein said method is configured for being executed on an image capture device selected from a group of image capture devices consisting of camera systems, camera-enabled cell phones, and other image-capture enabled electronic devices.

10. The method as recited in claim 8, wherein method is configured for performing auto focusing in which the focus device coupled to the image sensor is adjusted based on estimated focus distance, and another image is captured, after which focus distance estimation is again performed with the new depth, and repeating this process to maintain a proper focus on the selected target region.

11. The method as recited in claim 8, further comprising performing said recognition process by utilizing facial recognition.

* * * * *